United States Patent Office 2,841,596
Patented July 1, 1958

2,841,596
CYCLIC KETONES

Charles R. Stephens, Jr., Waterford, Conn., assignor to Chas. Pfizer & Co., Inc., Brooklyn, N. Y., a corporation of Delaware No Drawing. Application July 24, 1953
Serial No. 370,231

11 Claims. (Cl. 260—351)

This invention is concerned with a method for the preparation of certain cyclic ketones and with the novel compounds prepared by these methods.

A number of various poly ketones, keto alcohols and other compounds of this nature have been proposed in the past as sequestrants or chelating agents for the preparation of organic solvent-soluble derivatives with polyvalent metallic ions. Many of these compounds are limited in stability. The compounds prepared by the present invention have many advantages over previously prepared sequestering or chelating agents.

It has been found that a 1,8-hydroxylated-9(10)-anthracenone may be catalytically reduced to yield an 8,9-hydroxylated-3,4-dihydro-1(2)-anthracenone. This reaction may be shown as follows:

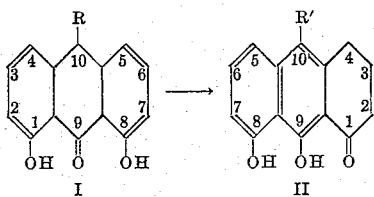

wherein R is 2 hydrogen atoms or oxygen, and R' is hydrogen or a hydroxyl group.

This type of reaction product (II) is a hitherto unknown, valuable material. The reaction is conducted by contacting the starting material with hydrogen in the presence of a hydrogenation catalyst and in an aqueous medium containing a strong base, preferably an alkali metal hydroxide. The product is obtained by this procedure in good yield.

One starting material for the present process, compound I ($R=H_2$) above, is a known material obtained from 1,8-dihydroxyanthraquinone. The reaction of the present invention is conducted with a hydrogenation catalyst. Raney nickel and the noble metal catalysts are particularly useful. Raney nickel may be prepared by methods described in the chemical literature from a nickel aluminum alloy. The noble metal catalysts may take a number of different forms. They may consist of the pure metal in a catalytically active form or, preferably, they are in the form of the noble metal on a suitable carrier. Palladium on activated carbon at a concentration of 5 or 10% by weight is very useful. It is obvious that the carrier must be suitable under the conditions of the reaction, this is, in aqueous alkali. In conducting the reduction process, the use of a weight of catalyst of from about 1.0% to about 100% by weight of the compound reduced has been found to be satisfactory. With more active catalysts, a lower concentration may be used. The use of a higher concentration is not necessary. This percentage of catalyst is based on the weight of the active metal and not on the gross weight of the catalyst and carrier when materials such as palladium-on-carbon are used.

The medium used for conducting the reaction is dilute aqueous alkali, especially an alkali metal hydroxide solution having a concentration of from about 2 to about 10%. Higher or lower concentrations may be used, but there is no good purpose in doing so. In general, sufficient alkali metal hydroxide is used to provide an excess over one mole per mole of the material to be reduced. Two or three moles are quite satisfactory for the purpose of this process. By alkali metal hydroxide we, of course, mean sodium hydroxide, potassium hydroxide, lithium hydroxide and so forth. The other alkali metal hydroxides may be used, but they are, of course, considerably more expensive and less available.

The present reaction may be conducted at room temperature, that is, at a temperature of from about 15° C. to about 30° C. Somewhat higher or lower temperatures are not deleterious, but they achieve no better results. A moderate pressure of hydrogen is also used in conducting the reaction; that is, a pressure of from about slightly less than about one atmosphere to about five atmospheres is quite satisfactory. Higher pressures may be used, but this is not necessary to achieve the reduction. In general, the reaction is completed within a few hours. This will vary somewhat depending upon the type of apparatus used, the rate of agitation of the mixture and the geometry of the reaction vessel, the proportion of catalyst used, the temperature, the pressure and so forth. In general, from about one to about twenty hours is required to complete the reaction.

When the reduction is completed, that is, after the absorption of the calculated one mole of hydrogen, the rate of reduction either decreases considerably or the reaction completely stops. The product, which is in the form of an alkali metal salt, is sometimes insoluble in water. If so, the product and catalyst are filtered and separated by any desired means. For instance, the alkali metal salt is leached from the catalyst by means of a suitable solvent such as a lower alcohol (e. g. 1 to 4 carbon alkanol) or, preferably, dimethylformamide. The solvent solution may then be acidified to obtain the product. Alternatively, the alcohol may be concentrated and/or water may be added to cause the alkali metal salt to separate. If the salt is soluble in the reaction medium, the catalyst is filtered and the product is recovered from the solution by evaporation or other conventional method.

Certain substituents may be present in the ring system of the compounds which are subjected to reduction by the present process. For instance, at the 10-position of the anthracene nucleus, there may be an additional keto group, as in 1,8-dihydroxyanthraquinone. During the reduction process, this group, that is, the 10-keto group, is also reduced to an hydroxy group. This reaction may be represented by the following formulas:

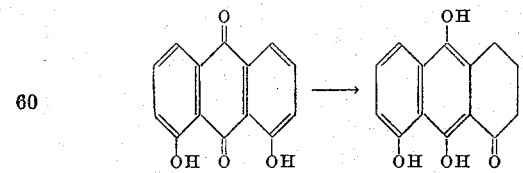

The product in this case is 8,9,10-trihydroxy-3,4-dihydro-1(2)-anthracenone.

A variety of substituents may be present on the nucleus other than at the 1,8,9 and 10 positions. This includes groups such as alkyl, hydroxyl, carboxyl, and so forth. For instance, 1,2,5,8-tetrahydroxyanthraquinone may be reduced in the same manner to yield the same type product, that is, a pentahydroxy-3,4-dihydro-1(2)-anthracenone. From the known substituted anthraquinone, rhein, there may be prepared 1,8 - dihydroxy-9(10)-anthracenone-3-carboxylic acid which, when reduced by the present process, yields the novel product, 8,9-dihydroxy-3,4-dihydro-1(2)-anthracenone-6-carboxylic acid. This is shown by the following formulas:

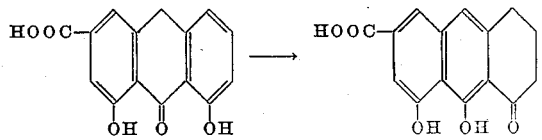

Metallic salts of this product may be readily prepared. The carboxylic acid group may, of course, be at other points of the nucleus.

Each of the products of this invention is a novel material often obtainable as a crystalline compound having characteristic melting point and ultraviolet absorption spectra. They are appreciably soluble in many organic solvents. Their alkali metal salts may be formed and certain of these solids are not appreciably soluble in water. Certain of these compounds possess a measure of biological activity against certain bacteria and fungi. For instance, 8,9-dihydroxy-3,4-dihydro-1(2)-anthracenone has an activity of about thirty oxytetracycline units per milligram when measured by the known oxytetracycline assay procedure in a turbidimetric method using *Klebsiella pneumoniae* as the test organism. Furthermore, this compound displays a high order of activity against various other microorganisms. The minimum inhibitory concentration against some of these microorganisms is listed in the table below. These were determined by standard bacteriological procedures.

| Organism: | Minimum inhibitory concentration, $\gamma$/ml. |
|---|---|
| Candida albicans | 0.78 |
| Staphylococcus aureus | 3.12 |
| Bacillus subtilis | 3.12 |
| Mycobacterium ranae | 6.25 |
| Mycobacterium phlei | 3.12 |
| Mycobacterium smegmatis | 1.56 |
| Mycobacterium 607 | 3.12 |
| Human pathogenic fungi: | |
| H. capsulatum | 100 |
| H. canis | 100 |
| T. sulfureum | 100 |
| B. dermatiditis | 100 |
| Phytopathogens: | |
| Rh. carotae | 10 |
| Vi. albo-atrum | 10 |
| Ph. parasiticia | 10 |
| Ph. parasiticia 1036 | 10 |

Not only do the compounds prepared by the method of this invention form salts with alkali metals, but they also form chelated complexes with a variety of polyvalent metals. These may be formed by the treatment of solutions, for example in lower alcohols, of the compounds with solutions of the chosen polyvalent metallic salts. Salts of copper, nickel, iron and cobalt are particularly effective in forming complexes of low solubility. These may often be obtained in crystalline form. Other polyvalent metallic ions, such as the alkaline earth metals, calcium, magnesium, etc., are also quite effective.

The following examples are given by way of illustration and are not intended as a limitation of this invention. Indeed, as many apparently widely different embodiments of the present invention may be made without departing from the spirit and scope hereof, it is to be understood that the invention is only limited as defined in the appended claims.

Example I

To 50 milliliters of 4% aqueous sodium hydroxide solution was added 3.0 grams of 1,8-dihydroxy-9(10)anthracenone and 2 grams of Raney nickel catalyst. The mixture was shaken under 50 pounds per square inch hydrogen pressure at room temperature (25° C.). After the absorption of one mole of hydrogen, no further uptake occurred. The reaction was complete in about four hours. The catalyst and the sodium salt of the product were filtered. The catalyst was washed repeatedly with small volumes of methanol to remove the sodium salt of 8,9-dihydroxy-3,4-dihydro-1(2)-anthracenone therefrom. The methanolic solution of the sodium salt was acidified with dilute hydrochloric acid and the yellow-orange product crystallized. This material had a melting point of 132°–134° C. A dilute solution in methanol, 0.1-normal in hydrochloric acid, displayed principal ultraviolet peaks at 265 and 405 m$\mu$. The product was obtained in approximately 60% yield. It may be recrystallized from ethyl acetate and it is fairly soluble in a number of organic solvents, but quite insoluble in water.

*Analysis.*—Calcd. for $C_{14}H_{12}O_3$: C, 73.7; H, 5.3. Found: C, 73.9; H, 5.3.

Example II

The reduction reaction of Example I was repeated with the use of 5% palladium-on-carbon catalyst rather than Raney nickel. The reduction was completed in about 15 hours. The product was isolated and found to be identical with that described above.

Example III

To 50 milliliters of 4% aqueous sodium hydroxide was added 3.0 grams of 1,8-dihydroxyanthraquinone and 1.5 grams of Raney nickel. The mixture was shaken under 40 pounds per square inch hydrogen pressure at room temperature for a total of 14 hours. Approximately two molecular proportions of hydrogen were absorbed by the compound during this period. The mixture was filtered and, upon acidification of the filtrate, the product, 8,9,10-trihydroxy - 3,4-dihydro - 1(2) - anthracenone, separated. The product was recrystallized by dissolving it in hot ether and allowing the solution to cool. The crystalline material melted at 187° to 189° C. It may also be recrystallized from methanol. Ultraviolet maxima at 267 and 427 m$\mu$ are characteristic of this material.

*Analysis.*—Calcd. for: $C_{14}H_{12}O_4$: C, 68.8; H, 4.9. Found: C, 68.6; H, 5.0.

Example IV

A mixture of dilute aqueous sodium hydroxide solution, 1,8 - dihydroxy-9(10)-anthracenone - 3 - carboxylic acid and Raney nickel was agitated under two atmospheres pressure of hydrogen at room temperature. After the absorption of one mole of hydrogen was complete, the mixture was filtered. From the solution there was isolated by evaporation the sodium salt of 8,9-dihydroxy-3,4-dihydro-1(2)-anthracenone-6-carboxylic acid.

What is claimed is:

1. A process for the preparation of an 8,9-dihydroxy-3,4-dihydro-1(2)-anthracenone, which comprises reacting an 1,8-dihydroxy-9(10)-anthracenone in dilute aqueous alkali with hydrogen in the presence of a hydrogenation catalyst.

2. A process as claimed in claim 1 wherein the hydrogenation catalyst is Raney nickel.

3. A process as claimed in claim 1 wherein the alkali is sodium hydroxide.

4. A process as claimed in claim 1 wherein the 8,9-dihydroxy-3,4-dihydro-1(2)-anthracenone is isolated by extraction of the solids from the reaction mixture with a lower alcohol.

5. A process as claimed in claim 1 wherein the 8,9-dihydroxy-3,4-dihydro-1(2)-anthracenone is isolated by extraction of the solids from the reaction mixture with dimethyl formamide.

6. A process as claimed in claim 1 wherein an 1,8-dihydroxyanthraquinone is reacted with hydrogen.

7. A compound selected from the group consisting of 8,9,10-trihydroxy-3,4-dihydro-1(2)-anthracenone and the metallic salts thereof.

8. A compound selected from the group consisting of 8,9-dihydroxy-3,4-dihydro-1(2)-anthracenone carboxylic acid and the metallic salts thereof.

9. A compound selected from the group consisting of 8,9-dihydroxy-3,4-dihydro-1(2)-anthracenone and the metallic salts thereof.

10. A process as claimed in claim 1 wherein the temperature is about 15° C. to about 30° C.

11. A process as claimed in claim 1 wherein a pressure of up to about 5 atmospheres is employed and the temperature is from about 15° C. to about 30° C.

References Cited in the file of this patent

Chem. Abst., V, 32, pages 2528–31 (1938), citing Karl Zahn et al., Berichte.